United States Patent [19]

Leone

[11] Patent Number: 5,090,530
[45] Date of Patent: Feb. 25, 1992

[54] WRAP SPRING CLUTCH/BRAKE UNIT WITH SPRING DIFFERENTIAL ADJUSTMENT

[75] Inventor: Michael F. Leone, Sewell, N.J.

[73] Assignee: Dana Corporation, Toledo, Ohio

[21] Appl. No.: 635,307

[22] Filed: Dec. 28, 1990

[51] Int. Cl.⁵ .................................. F16D 67/02
[52] U.S. Cl. ........................ 192/128 A; 192/26
[58] Field of Search ........................ 192/26, 12 BA

[56] References Cited

U.S. PATENT DOCUMENTS

| | | |
|---|---|---|
| 2,134,202 | 10/1938 | Racklyeft .................. 192/26 |
| 2,922,220 | 1/1960 | Sacchini .................. 192/12 BA |
| 2,927,551 | 3/1960 | Revis et al. .............. 192/12 BA X |
| 3,021,512 | 2/1962 | Welsh et al. .............. 192/26 X |
| 3,062,345 | 11/1962 | Cruzen .................... 192/26 |
| 3,277,986 | 10/1966 | Beare ..................... 192/12 BA X |
| 3,521,730 | 7/1970 | Weatherby ................. 192/12 BA |
| 3,559,781 | 2/1971 | Brunelle .................. 192/12 |
| 3,915,268 | 10/1975 | MacDonald ................. 192/12 BA |
| 3,985,212 | 10/1976 | Gershnow et al. ........... 192/12 BA |
| 3,987,880 | 10/1976 | Holland-Letz et al. ....... 192/12 BA |
| 4,059,176 | 11/1977 | Lowery et al. ............. 192/26 X |
| 4,189,039 | 2/1980 | Johnson ................... 192/26 |
| 4,189,040 | 2/1980 | Braunschweig .............. 192/26 |

Primary Examiner—Leslie A. Braun
Assistant Examiner—Nicholas Whitelan
Attorney, Agent, or Firm—Leydig, Voit & Mayer

[57] ABSTRACT

The tangs of the clutch and brake springs of a wrap spring clutch/brake unit are connected to separate sleeves which form the control collar of the unit. The sleeves are normally coupled for rotation in unison by an internally splined ring which may be slid to a released position permitting relative rotation of the sleeves for purposes of adjusting the torsional differential of the springs.

5 Claims, 2 Drawing Sheets

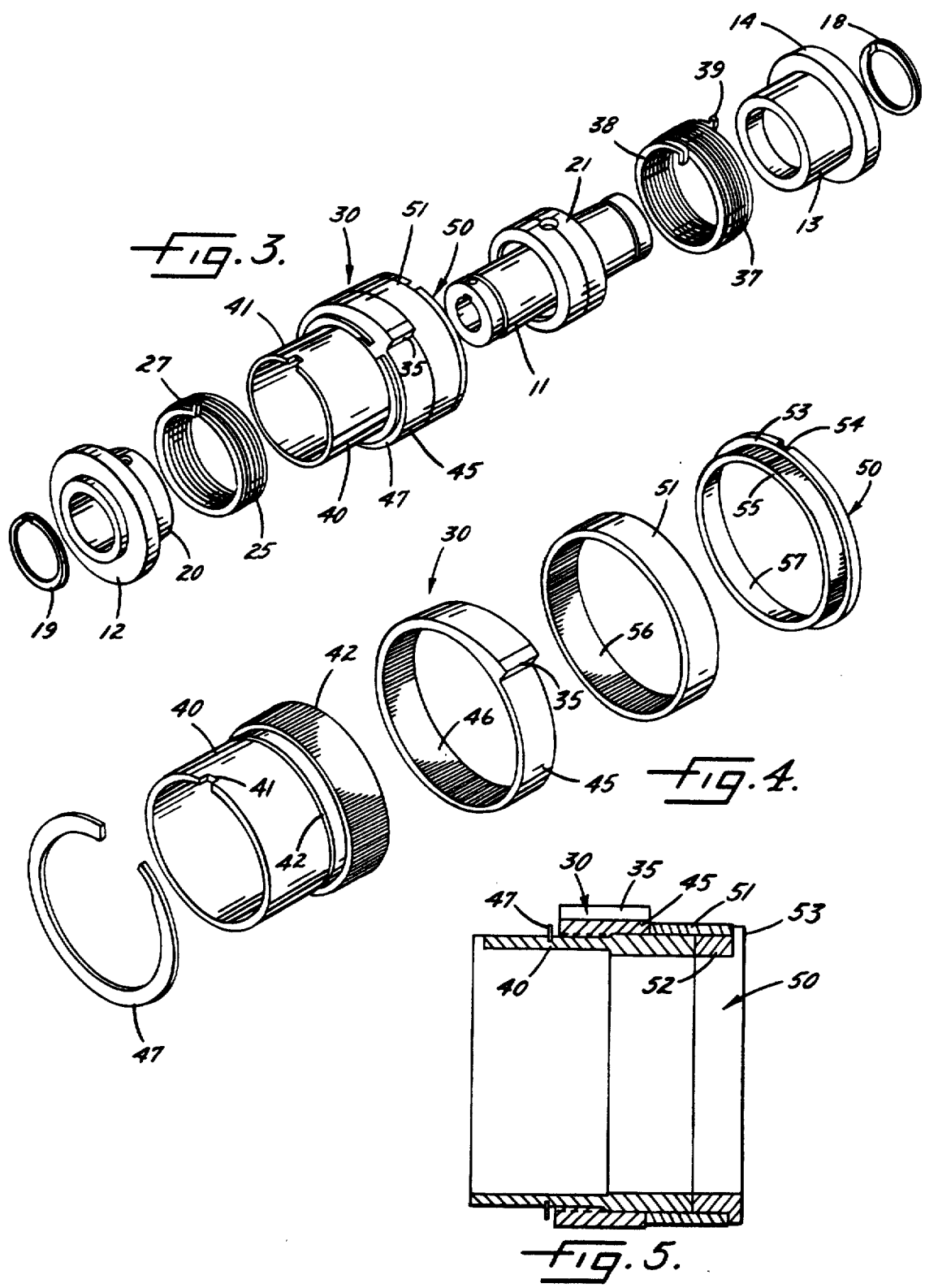

WRAP SPRING CLUTCH/BRAKE UNIT WITH SPRING DIFFERENTIAL ADJUSTMENT

BACKGROUND OF THE INVENTION

This invention relates to a clutch/brake unit and more particularly to a wrap spring clutch/brake unit of the type in which the clutching and braking action is produced in response to the contraction of helical springs.

A clutch/brake unit of this general type is disclosed in Brunelle U.S. Pat. No. 3,559,781. Such a unit includes relatively rotatable input and output hubs which are encircled by a helical spring. When contracted, the spring couples the two hubs together for rotation in unison and, when expanded, allows the input hub to rotate relative to the output hub.

A second helical spring encircles the output hub and a rotationally fixed brake hub. When the brake spring is contracted, it couples the output hub to the brake hub in order to prevent rotation of the output hub. Upon expansion of the brake spring, the output hub is released to rotate with the input hub and to rotate relative to the brake hub. The brake spring is expanded and contracted when the clutch spring is contracted and expanded, respectively.

Expansion and contraction of the springs is effected by a control collar. One tang of each spring is connected to the control collar while the second tang of each spring is connected to the output hub. The clutch spring normally is contracted around both the input hub and the output hub and normally causes the control collar to rotate in unison with those hubs. When rotation of the collar is stopped, the collar causes the clutch spring to expand and causes the brake spring to contract.

It is necessary to locate the tangs of the clutch and brake springs in precise angular positions relative to one another in order to establish a proper torsional differential between the two springs. In the clutch/brake unit of the Brunelle patent, this is achieved by forming multiple angularly spaced notches around each end of the control collar and by placing the tang of each spring in a selected notch. While this arrangement enables fine and precise adjustment of the spring differential, the adjustment can be effected only by removing the tangs from the selected notches and placing the tangs in different notches. This requires that several components of the clutch/brake unit be completely disassembled and then reassembled.

SUMMARY OF THE INVENTION

The general aim of the present invention is to provide a new and improved clutch/brake unit of the foregoing type in which the spring differential may be adjusted quicker and easier than has been possible heretofore and without need of moving the tangs of the springs from notch-to-notch.

A more detailed object of the present invention is to achieve the foregoing by providing a clutch/brake unit having a unique multi-piece control collar whose components may be easily unlocked, turned relative to one another to adjust the spring differential and then re-locked to maintain the springs at the established differential.

The invention also resides in the novel splined construction of the control collar components to enable fine and precise adjustment of the spring differential.

These and other objects and advantages of the invention will become more apparent from the following detailed description when taken in conjunction with the accompanying drawings.

BRIEF DESCRIPTION OF THE DRAWINGS

FIG. 3 is an exploded perspective view of the primary components of the clutch/brake unit.

FIG. 4 is an exploded perspective view of the control collar.

FIG. 5 is a cross-sectional view taken axially through the control collar.

DETAILED DESCRIPTION OF THE PREFERRED EMBODIMENT

Figure 1:
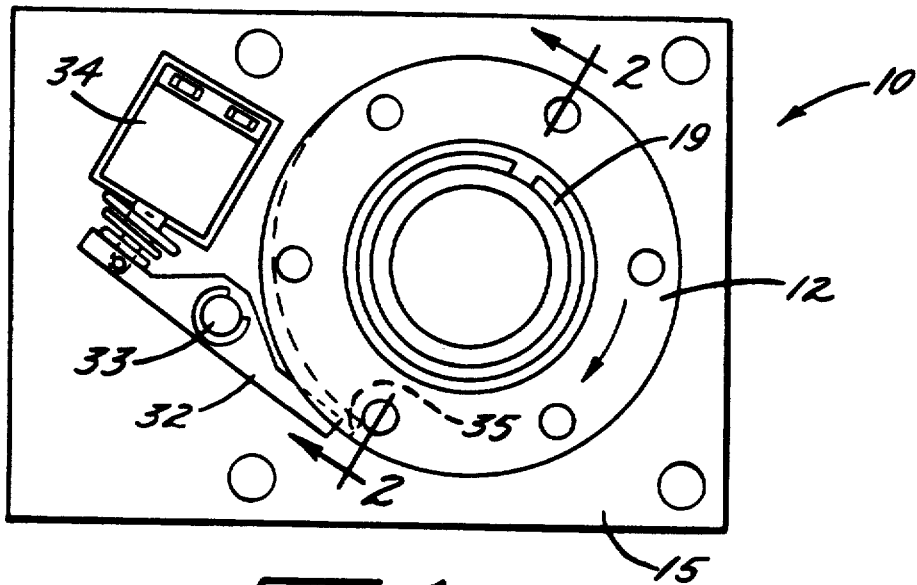
FIG. 1 is an end view of a new and improved clutch/brake unit incorporating the unique features of the present invention.

As shown in the drawings for purposes of illustration, the invention is embodied in a clutch/brake unit 10 for controlling rotation of an output member 11 (FIG. 2) relative to an input member 12. Herein, the output member is in the form of a tubular shaft which is journaled for rotation in a cylindrical hub 13. The latter is formed with a radially projecting flange 14 which is secured to a frame plate 15 by a pair of angularly spaced screws 17. A snap ring 18 on the shaft engages the outboard end of the hub 13 to captivate the latter axially on the shaft.

In this instance, the input member 12 is a disc which is journaled to rotate on the output shaft 11. The disc 12 is retained axially on the shaft by a snap ring 19 fixed to the shaft and engageable with the outboard face of the disc.

An input hub 20 is formed integrally with and extends axially from the inboard face of the disc 12 and is disposed end-to-end with an output hub 21. The latter also is disposed end-to-end with the hub 13 and is secured rigidly to the shaft 11 by a radially extending roll pin 22.

Encircling the input and output hubs 20 and 21 is a helical clutch spring 25 whose inboard end is formed with a radially inwardly extending tang 26 which is anchored in a hole in the output hub 21. The outboard end of the clutch spring 25 is formed with a radially outwardly extending tang 27 which is secured to sleeve means in the form of a control collar 30 which is telescoped over the hubs 13, 20 and 21.

The relaxed inner diameter of the clutch spring 25 is smaller than the outer diameter of the input and output hubs 20 and 21 and thus the clutch spring normally is contracted tightly around the hubs. Accordingly, the clutch spring normally transmits rotation of the input hub to the output hub, the control collar 30 rotating with the two hubs. When the control collar is stopped, the stopped tang 27 causes the spring 25 to unwind and expand and thereby release one or both of the hubs 20 and 21 so that the input hub may rotate independently of the output hub. Stopping of the control collar is effected by a lever 32 (FIG. 1) pivotally mounted on the frame plate 15 at 33 and adapted to be swung between active and inactive positions by a solenoid 34 on the frame plate. When the lever 32 is swung counterclockwise to its active position shown in FIG. 1, its free end is located in the path of a radially extending stop or lug 35 (FIGS. 3 to 5) on the control collar. When the lug engages the lever, rotation of the control collar is stopped so as to effect unwinding and expansion of the spring 25. Upon being swung clockwise, the lever 32 releases the lug 35 to allow the resilience of the spring to rotate the collar slightly relative to the output hub and thereby permit the spring to re-contract.

Encircling the hub 13 and the output hub 21 is a second helical spring 37 (FIGS. 2 and 3) which is of the same hand as the clutch spring 25 and which serves as a brake spring, the hub 13 serving as a brake hub. The inboard end of the brake spring 37 is formed with a radially inwardly projecting tang 38 anchored in a hole in the output hub 21. A radially outwardly projecting tang 39 at the outboard end of the brake spring is secured to the control collar 30.

The relaxed inner diameter of the brake spring is greater than the outer diameters of the brake and output hubs 13 and 21 and thus the brake spring normally is released from those hubs. When the control collar 30 is stopped, any tendency for the output hub to rotate in the forward direction of drive rotation causes the brake spring to contract around the hubs 13 and 21. The output hub thus becomes coupled to the fixed brake hub and is positively held against rotation.

Figure 2:
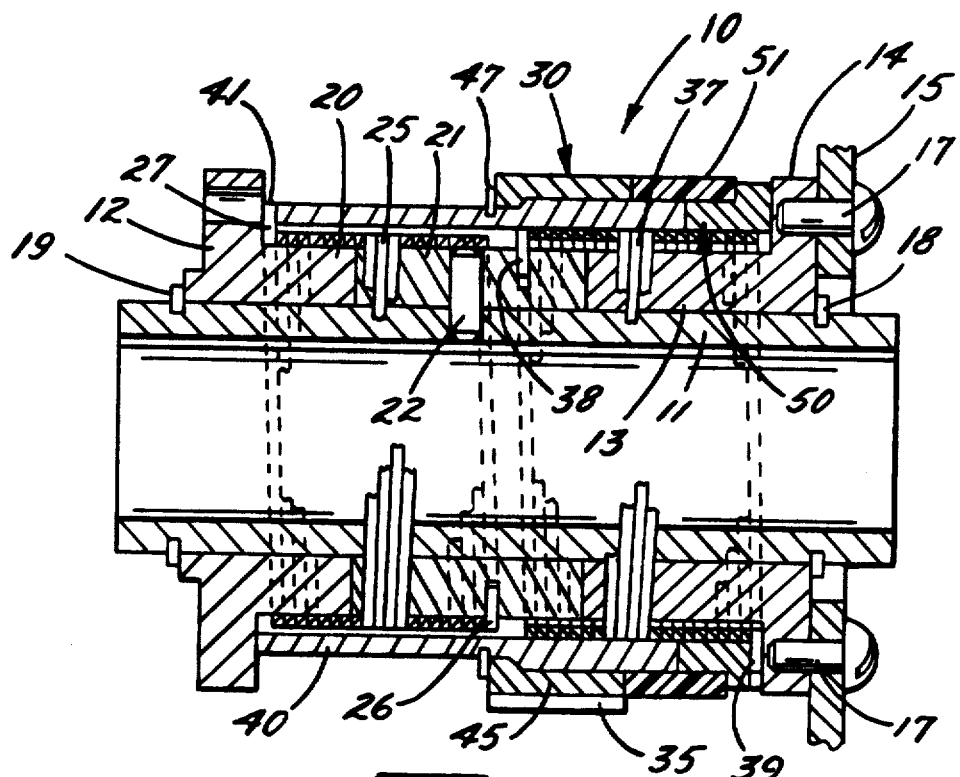
FIG. 2 is an enlarged fragmentary cross-section taken substantially along the line 2—2 of FIG. 1.

As shown most clearly in FIGS. 2 and 4, the control collar 30 includes a first sleeve 40 which encircles substantially all of the clutch spring 25 and a substantial portion of the brake spring 37. The outboard end of the sleeve is disposed face-to-face with the disc 12. A notch 41 is formed in the outboard end of the sleeve and receives the tang 27 of the clutch spring 25.

Axially extending splines 42 (FIG. 4) are formed on the external surface of the inboard end portion of the sleeve 40, the splines being very "fine" and closely spaced. By way of example, 200 spline teeth may be formed around a sleeve having an outer diameter of about 2¼ inches.

Telescoped over and mating with the splines 42 is a generally cylindrical ring 45 (FIGS. 2 to 5) whose internal surface is formed with splines 46 (FIG. 4) which are complementary with the splines 42. The stop lug 35 is formed as an integral part of and projects radially from the ring 45. A snap ring 47 fits in a groove 48 in the sleeve 40 and normally captivates the ring 45 axially in a position in which the splines 46 mate with the splines 42. Thus, the ring 45 normally rotates with the sleeve 40. By removing the snap ring 47, the ring 45 may be slid to the left (FIG. 2) along the sleeve 40 to release the splines 46 from the splines 42. The ring 45 then may be rotated relative to the sleeve 40 in order to locate the stop lug 35 in a desired angular position relative to the output shaft 11. Thereafter, the ring may be slid to the right to re-engage the splines 46 with the splines 42 and thereby hold the lug in the selected angular position.

In accordance with the present invention, the control collar 30 includes a second sleeve 50 (FIG. 4) and a second ring 51 which coact with the sleeve 40 to enable quick and easy and fine and precise adjustment of the torsional differential between the clutch spring 25 and the brake spring 37. As will become apparent subsequently, the adjustment may be effected without need of disconnecting the springs from the sleeves and without any substantial disassembly of the clutch/brake unit 10.

More specifically, the sleeve 50 includes a cylindrical annulus 52 (FIG. 4) whose outboard end is formed with a radially outwardly projecting flange 53 of short radial length and disposed face-to-face with the flange 14. A notch 54 is formed in the flange 53 and is adapted to receive the tang 39 of the brake spring 37.

In carrying out the invention, the external surface of the annulus 52 is formed with axially extending splines 55 which mate with an equal number of complementary splines 56 in the internal surface of the ring 51. The splines 56, in turn, are equal in number to and are adapted to mate with and telescope over the splines 42 on the sleeve 40.

As shown in FIGS. 2 and 5, the assembled collar 30 includes the sleeve 40, the snap ring 47, the ring 45, the ring 51 and the sleeve 50. The ring 51 engages the flange 53 of the sleeve 50 and thus the two rings 45 and 51 normally are captivated axially between the snap ring 47 and the flange 53. Because of the splines 42, 46, 55 and 56, the two sleeves 40 and 50 and the two rings 45 and 51 all normally rotate as a unit. Thus, a fixed angular relation normally is maintained between the tang 27 of the clutch spring 25 and the tang 39 of the brake spring 37.

To adjust the torsional differential of the springs 25 and 37, the snap ring 47 is removed and both rings 45 and 51 are moved to the left in order to release the splines 56 of the ring 51 from the splines 55 of the sleeve 50. Thereafter, the sleeve 50 may be rotated in either direction relative to the sleeve 40 to the extent necessary to establish the proper torsional differential between the springs 25 and 37. The rings 45 and 51 then are slid back to the right and are locked in place by re-installing the snap ring 47 and, once locked, the ring 51 holds the sleeves against relative rotation. If the spring differential as initially established is too small or large, all that is necessary is to again remove the snap ring 47, release the splines 56 from the splines 55 and rotate either the sleeve 40 or the sleeve 50 to establish a new spring differential.

From the foregoing, it will be apparent that the present invention brings to the art a new and improved clutch/brake unit 10 in which the spring differential may be adjusted in fine and precise increments simply by releasing the ring 51, turning one of the sleeves 40 and 50, and then relocking the ring. As a result, there is no need to provide multiple notches 41, 54 in the sleeves 40, 50 and to remove the tangs 27, 39 from the notches in order to adjust the differential.

I claim:

1. A clutch/brake unit comprising rotatable input and output hubs, a rotationally fixed brake hub, a clutch spring telescoped over said input and output hubs and operable when contracted to couple said input hub and said output hub for rotation in unison, said clutch spring being operable when expanded to permit relative rotation of said input and output hubs, a brake spring telescoped over said output and brake hubs and operable when contracted to couple said output hub to said brake hub and thereby prevent rotation of said output hub, said brake spring being operable when expanded to permit said output hub to rotate relative to said brake hub, and means for controlling said springs, said means comprising first sleeve means encircling said input hub and having inboard and outboard end portions, said clutch spring being anchored to said first sleeve means, the inboard end portion of said first sleeve means being splined, second sleeve means encircling said brake hub and having inboard and outboard end portions, said brake spring being anchored to said second sleeve means, the inboard end portion of said second sleeve means being splined complementary to and being telescoped with the inboard end portion of said first sleeve means.

2. A clutch/brake unit as defined in claim 1 in which the inboard end portion of said first sleeve means comprises a sleeve and further comprises a ring splined with said sleeve and with the inboard end portion of said second sleeve means thereby to lock said sleeve and said second sleeve means against relative rotation, said ring being selectively slidable to a position permitting said second sleeve means to rotate relative to said sleeve thereby to enable adjustment of the torsional differential between said springs.

3. A clutch/brake unit as defined in claim 2 in which said sleeve and said second sleeve means are externally splined, said ring being internally splined.

4. A clutch/brake unit comprising rotatable input and output hubs, a rotationally fixed brake hub, a clutch spring telescoped over said input and output hubs and operable when contracted to couple said input hub and said output hub for rotation in unison, said clutch spring being operable when expanded to permit relative rotation of said input and output hubs, a brake spring telescoped over said output and brake hubs and operable when contracted to couple said output hub to said brake hub and thereby prevent rotation of said output hub, said brake spring being operable when expanded to permit said output hub to rotate relative to said brake hub, and means for selectively permitting adjustment of the torsional differential of said springs, said means comprising a first sleeve encircling said input hub and having inboard and outboard end portions, said clutch spring being anchored to the outboard end portion of said first sleeve, a second sleeve encircling said brake hub and having inboard and outboard end portions, said brake spring being anchored to the outboard end portion of said second sleeve, the inboard end portions of said sleeves being externally splined, and an internally splined ring normally telescoped over and splined to the inboard end portions of said sleeves so as to normally couple said sleeves for rotation in unison, said ring being selectively slidable along said sleeves and off of the splined inboard end portion of one of said sleeves so as to permit such sleeve to be rotated relative to the other sleeve and thereby effect adjustment of the torsional differential of said springs.

5. A clutch/brake unit as defined in claim 4 further including a second ring having a radially extending stop thereon, said second ring being internally splined and being telescoped over the inboard end portion of said first sleeve so as to normally rotate in unison with said first sleeve and being selectively slidable to a position permitting said second ring to rotate relative to said first sleeve thereby to enable adjustment of the angular position of said stop relative to said first sleeve, said first ring being located between said second ring and the outboard end portion of said second sleeve.

* * * * *